United States Patent
Kao et al.

(10) Patent No.: US 8,902,952 B2
(45) Date of Patent: Dec. 2, 2014

(54) METHOD AND DEVICE FOR ACQUIRING A CODE PHASE SHIFT BETWEEN AN INPUT SEQUENCE AND A REFERENCE SEQUENCE

(75) Inventors: Ming-Seng Kao, Hsinchu (TW); Chieh-Fu Chang, New Taipei (TW); Wan-Hsin Hsieh, Dayuan Township, Taoyuan County (TW)

(73) Assignees: National Chiao Tung University, Hsinhu (TW); National Applied Research Laboratories, Taipei (TW)

( * ) Notice: Subject to any disclaimer, the term of this patent is extended or adjusted under 35 U.S.C. 154(b) by 184 days.

(21) Appl. No.: 13/605,650

(22) Filed: Sep. 6, 2012

(65) Prior Publication Data

US 2013/0107927 A1    May 2, 2013

(30) Foreign Application Priority Data

Oct. 31, 2011  (TW) .............................. 100139583 A

(51) Int. Cl.
  *H04B 1/00*    (2006.01)
  *H04B 17/00*   (2006.01)

(52) U.S. Cl.
  CPC ..................................... *H04B 17/00* (2013.01)
  USPC ........... 375/149; 375/145; 375/150; 375/325; 375/356; 375/359

(58) Field of Classification Search
  CPC ....... G01S 19/29; G01S 19/30; H04B 1/7093; H04B 1/709; H04L 2027/0028
  USPC .................. 375/130–153, 316–345, 354–371
  See application file for complete search history.

(56) References Cited

U.S. PATENT DOCUMENTS

| | | | | |
|---|---|---|---|---|
| 7,266,142 | B2* | 9/2007 | Sullivan | 375/147 |
| 7,453,925 | B2* | 11/2008 | Keegan et al. | 375/148 |
| 7,471,716 | B2* | 12/2008 | Tamaki | 375/150 |
| 7,711,036 | B2* | 5/2010 | Hafuka | 375/149 |
| 7,860,194 | B2* | 12/2010 | Kim et al. | 375/341 |
| 7,894,508 | B2* | 2/2011 | Hahm et al. | 375/150 |
| 7,916,771 | B2* | 3/2011 | Julien et al. | 375/145 |
| 8,068,533 | B2* | 11/2011 | Levin et al. | 375/147 |
| 8,125,381 | B2* | 2/2012 | Bryant et al. | 342/357.59 |
| 8,189,646 | B2* | 5/2012 | Ries et al. | 375/140 |
| 8,331,422 | B2* | 12/2012 | Weill | 375/150 |
| 2003/0231704 | A1* | 12/2003 | Tanaka et al. | 375/150 |
| 2003/0235241 | A1* | 12/2003 | Tamura | 375/150 |

(Continued)

OTHER PUBLICATIONS

Chieh-Fu Chang, *National Space Organization, Taiwan* and Wan-Hsin Hsieh and Ming-Seng Kao, *National Chiao-Tung University, Taiwan*, "A Novel Computationally Efficient Code Phase Acquisition Method," scholarly article (6 pages), Sep. 20-23, 2011.

*Primary Examiner* — Sam K Ahn
*Assistant Examiner* — James M Perez
(74) *Attorney, Agent, or Firm* — DLA Piper LLP (US)

(57) ABSTRACT

A method for acquiring a code phase shift between an input sequence and a reference sequence is provided. The method is to be implemented using an acquisition device that includes a mapping unit configured to transform the input sequence and the reference sequence respectively into an input signal and a reference signal each with a complex phase, a comparison unit configured to compare the input signal with the reference signal so as to obtain a phase coherent indicator, and calculating unit configured to obtain the code phase shift between the input sequence and the reference sequence based on a phase of the phase coherent indicator and a number of bits of the input sequence.

14 Claims, 11 Drawing Sheets

(56) References Cited

U.S. PATENT DOCUMENTS

2006/0072653 A1* 4/2006 Hafuka ................... 375/148
2006/0198427 A1* 9/2006 Sullivan ................. 375/147
2007/0195867 A1* 8/2007 Betz et al. .............. 375/152
2010/0171526 A1* 7/2010 Chang et al. .............. 327/7
2013/0279541 A1* 10/2013 Goldberg et al. ......... 375/142

* cited by examiner

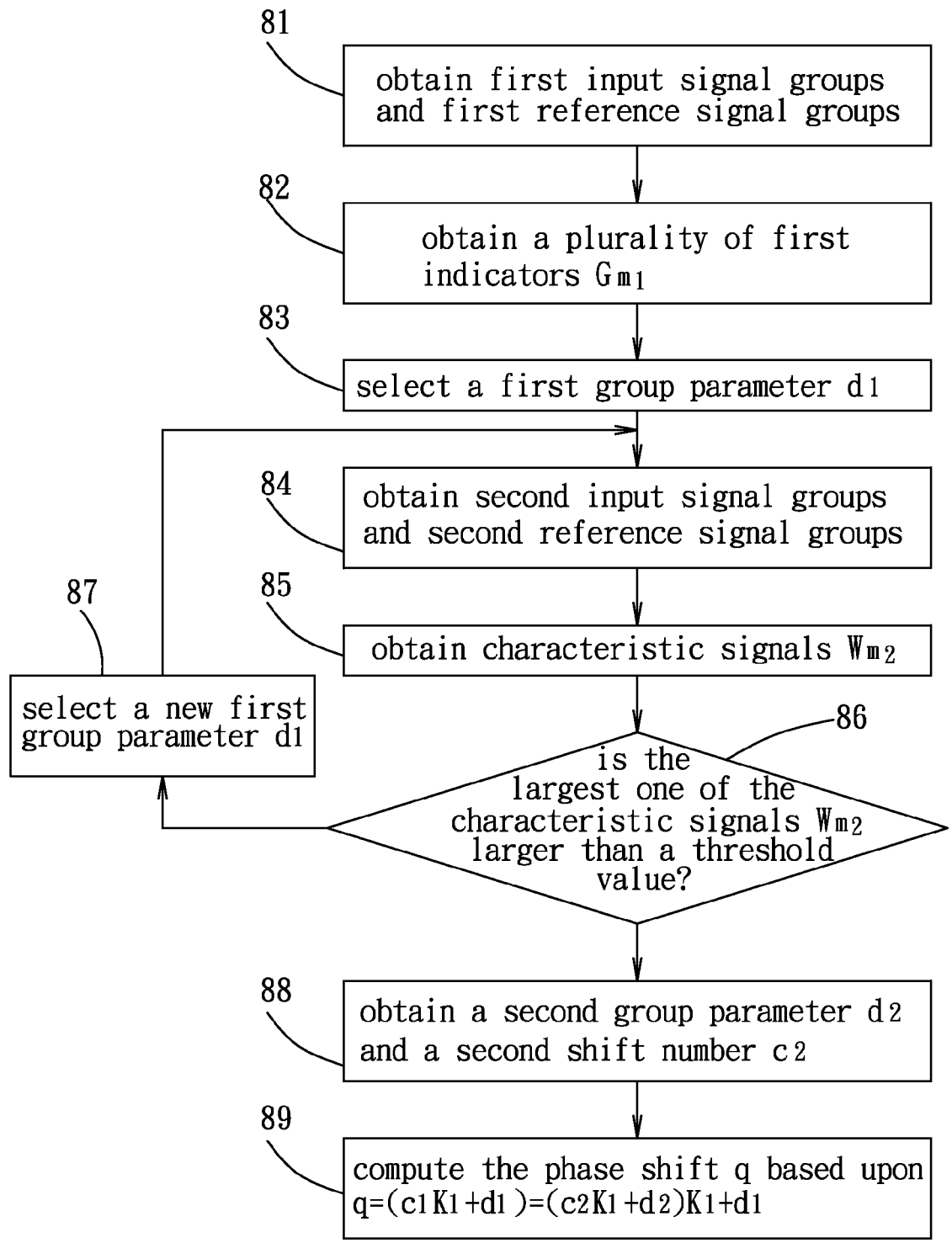
F I G. 6

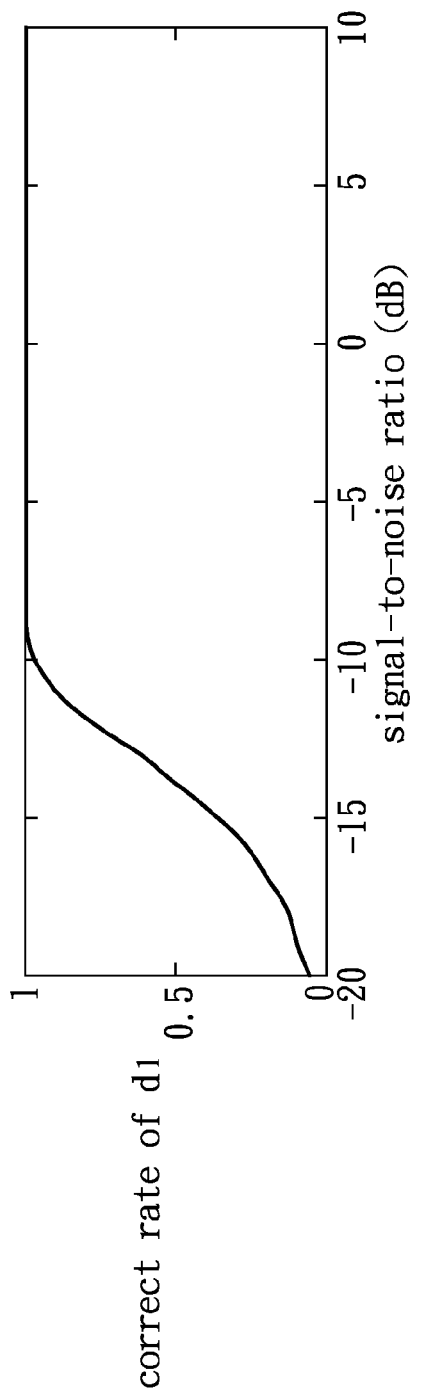
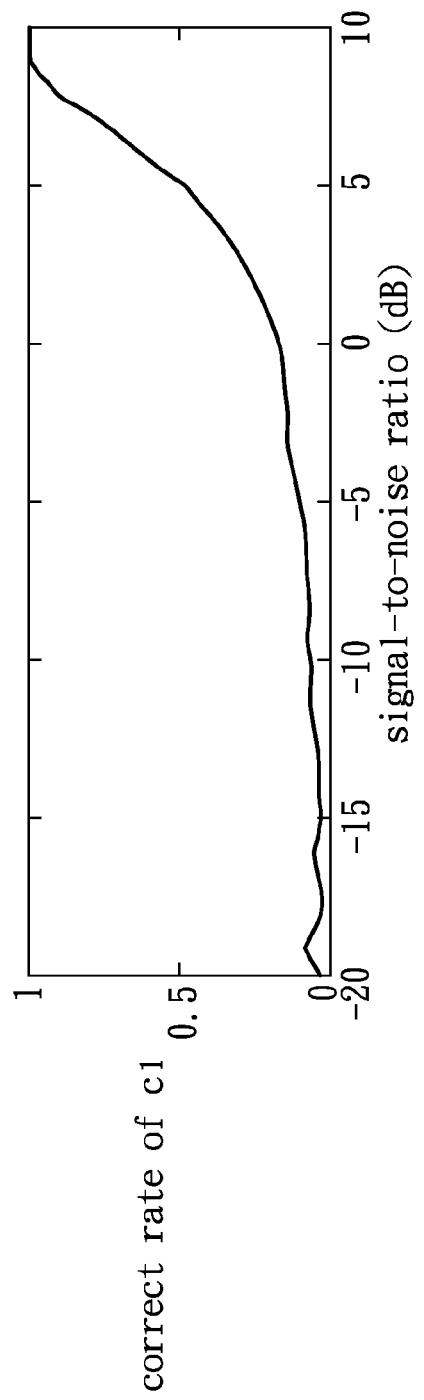
F I G. 7
F I G. 8

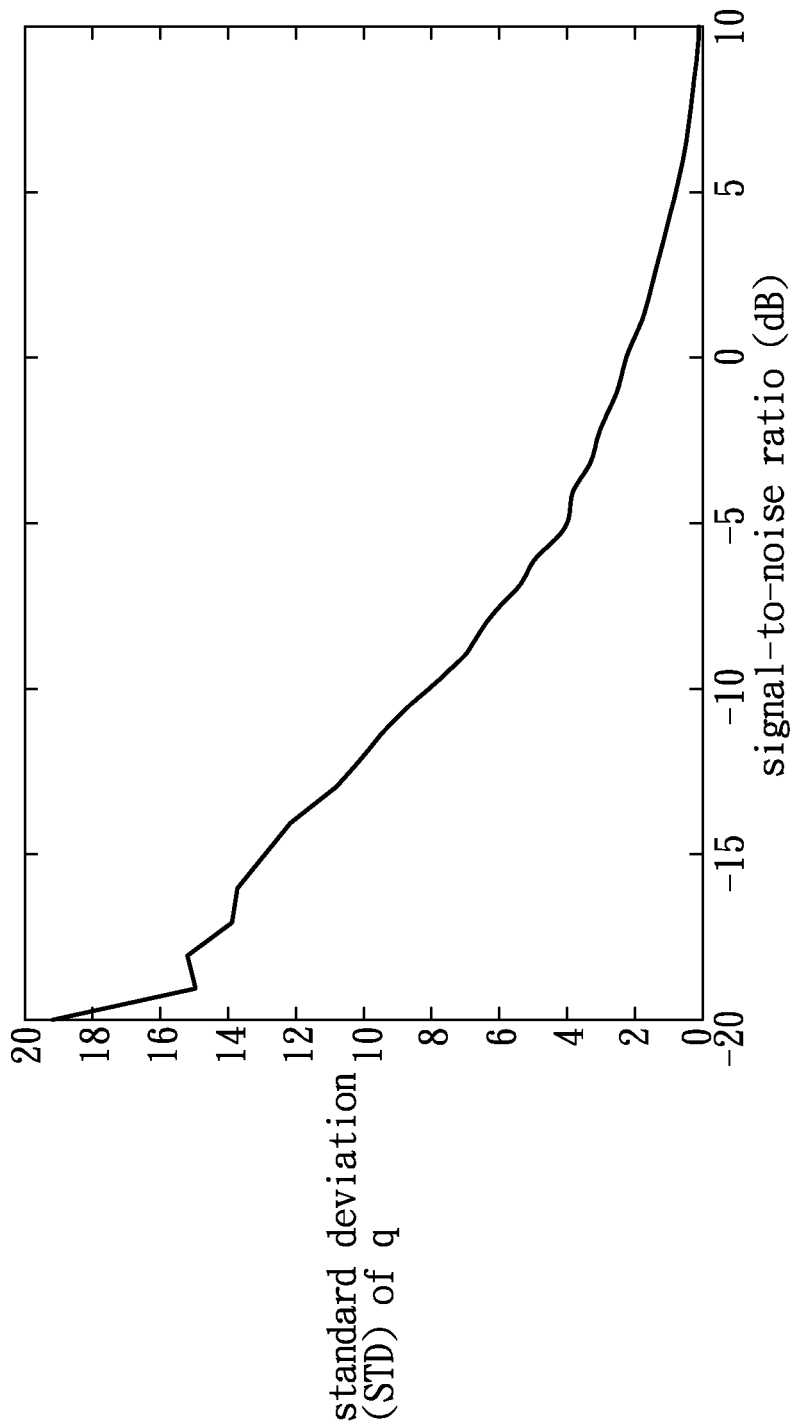
F I G. 9

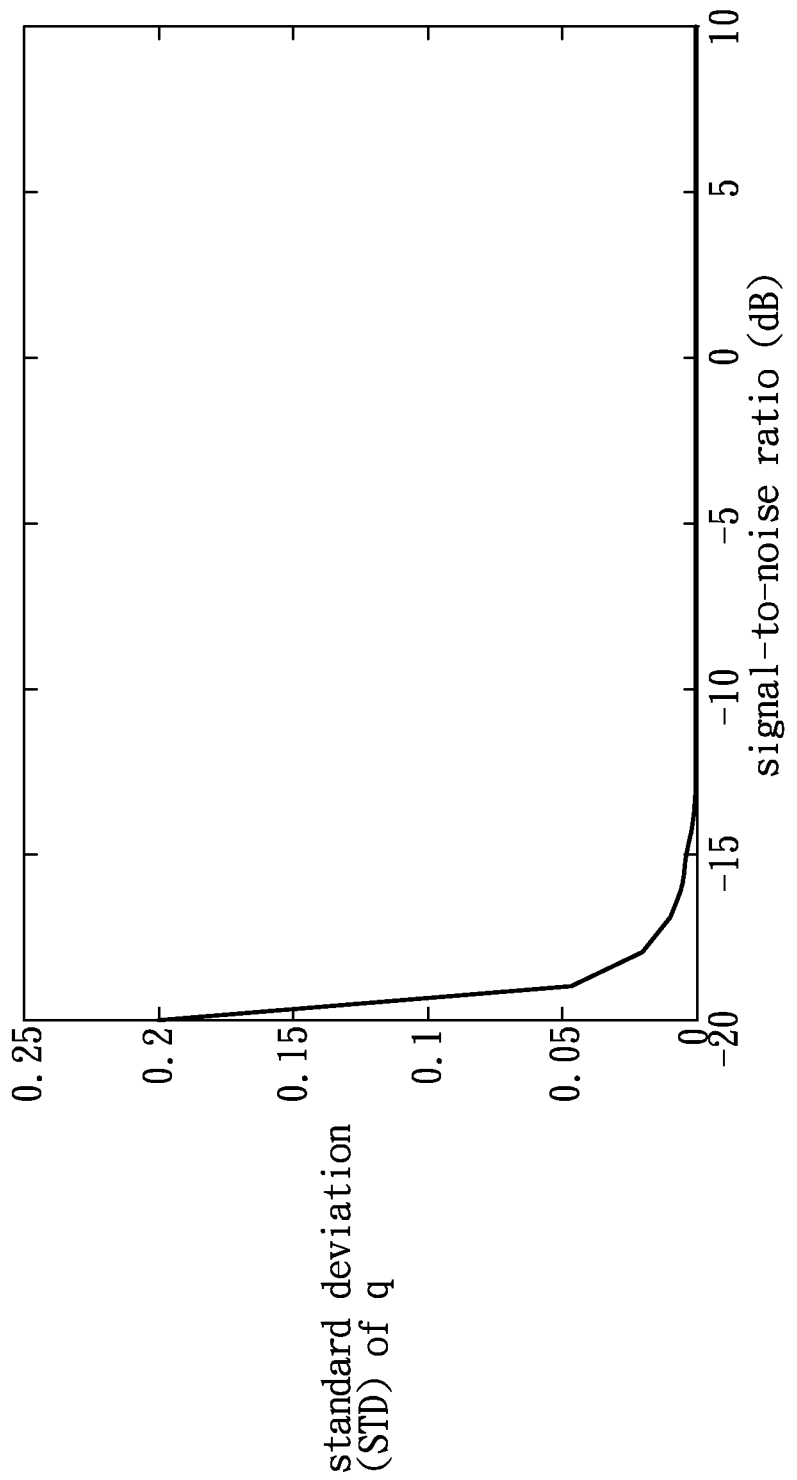
F I G. 12

METHOD AND DEVICE FOR ACQUIRING A CODE PHASE SHIFT BETWEEN AN INPUT SEQUENCE AND A REFERENCE SEQUENCE

CROSS-REFERENCE TO RELATED APPLICATION

This application claims priority of Taiwanese Application No. 100139583, filed on Oct. 31, 2011.

BACKGROUND OF THE INVENTION

1. Field of the Invention

The invention relates to a method and a device for acquiring a code phase shift, more particularly to a method and a device for acquiring the code phase shift between pseudo random (PN) sequences.

2. Description of the Related Art

In a general signal processing system, a phase shift between a pseudo-random (PN) input sequence and a reference sequence is useful in many aspects, such as signal synchronization and data analysis.

In order to obtain the phase shift, the cross-correlation between the input sequence with a current phase and the reference sequence is first obtained. The phase of the input sequence is subsequently varied, and a group of cross-correlations associated with different phases of the input sequence are obtained accordingly. A peak cross-correlation that has a greatest magnitude is selected from the aforementioned group, and the phase difference between the reference sequence and the phase of the input sequence that results in the peak cross-correlation is the desired phase shift.

Conventionally, the cross-correlations are computed using convolution theory, computation of which is not practical in time-domain because of the numerous multiplication and integration computations involved. According to the convolution theorem, convolution in one domain (e.g., time domain) equals point-wise multiplication in the other domain (e.g., frequency domain). Therefore, Fast Fourier Transformation (FFT) is used for transforming the sequences from the time domain to the frequency domain, so as to eliminate the requirement of integration computation.

However, FFT has a drawback in that FFT involves complex multiplication and addition, resulting in a computational complexity of $N \cdot \log_2 N$ when processing a sequence of length N. That is, as the length N of the sequence increases, computational load of FFT for processing the sequence is increased at an even faster rate. As a result, FFT may be unsuitable in a signal processing system that involves a sequence with a very large length N, such as in a global navigation satellite system (GNSS) or a global positioning system (GPS).

SUMMARY OF THE INVENTION

Therefore, one object of the present invention is to provide a method to obtain a phase shift between a PN sequence and a reference sequence.

According to one aspect, a method of the present invention is for acquiring a code phase shift between an input sequence and a reference sequence, and is implemented using an acquisition device that includes a mapping unit, a comparison unit and a calculating unit. The method comprises the following steps of:

configuring the mapping unit to transform the input sequence into an input signal with a complex phase, and to transform the reference sequence into a reference signal with a complex phase;

configuring the comparison unit to compare the input signal with the reference signal so as to obtain a phase coherent indicator according to the input signal and the reference signal; and configuring the calculating unit to obtain the code phase shift between the input sequence and the reference sequence based on a phase of the phase coherent indicator and a number of bits of the input sequence.

According to another aspect, a method of the present invention is for acquiring a code phase shift between an input sequence and a reference sequence, and is implemented using an acquisition device that includes a mapping unit, a comparison unit and a calculating unit. The method comprises the following steps of:

configuring the first mapping unit to partition the input sequence including a number N of bits $\{x_0, x_1, x_2, \ldots, x_{N-1}\}$ into a number $K_1$ of first input sequence groups each including a number $M_1$ of bits $(x_{n_1 K_1 + i})$ and transform first input sequence groups into first input signal groups with complex phases, and to partition the reference sequence including the number N of bits $\{y_0, y_1, y_2, \ldots, y_{N-1}\}$ into a number $K_1$ of first reference sequence groups each including the number $M_1$ of bits $(y_{n_1 K_1 + i})$ and to transform first reference sequence groups into first reference signal groups with complex phases, where $n_1 = 0 \sim (M_1 - 1)$, $N = K_1 \times M_1$ and $i = 0 \sim (K_1 - 1)$; configuring the first comparison unit to obtain a plurality of first indicators, each of which is computed based on a respective permutation of the first input signal groups with a particular order and a corresponding permutation of the first reference signal groups with an offset of a number $m_1$ of bits from the first input signal groups, where $m_1 = 0 \sim (K_1 - 1)$; and configuring the calculating unit to obtain the code phase shift based on one of the numbers $m_1$ that is associated with one of the first indicators with a largest magnitude.

Another object of the present invention is to provide an acquisition device that is capable of implementing the previously described methods.

Accordingly, an acquisition device of this invention is for acquiring a code phase shift between a PN input sequence and a reference sequence. The input sequence includes a number N of bits $\{x_0, x_1, x_2 \ldots, x_{N-1}\}$, and the reference sequence includes the number N of bits $\{y_0, y_1, y_2 \ldots y_{N-1}\}$. The device comprises a mapping unit, a comparison unit and a calculating unit.

The mapping unit is operable to transform the input sequence into an input signal with a complex phase, and to transform the reference sequence into a reference signal with a complex phase. The input signal is partitioned and transformed into $K_1$ of first input signal groups each including a number $M_1$ of bits $(x_{n_1 K_1 + i})$, and the reference signal is partitioned and transformed into the number $K_1$ of first reference signal groups each including the number $M_1$ of bits $(y_{n_1 K_1 + i})$, where $n_1 = 0 \sim (M_1 - 1)$, $N = K_1 \times M_1$, and $i = 0 \sim (K_1 - 1)$.

The comparison unit is operable to obtain a plurality of first indicators, each of which is computed based on a respective permutation of the first input signal groups with a particular order and a corresponding permutation of the first reference signal groups with an offset of a number $m_1$ of bits from the first input signal groups, where $m_1 = 0 \sim (K_1 - 1)$.

The calculating unit is operable to obtain the code phase shift based on one of the numbers $m_1$ that is associated with one of the first indicators with a largest magnitude.

BRIEF DESCRIPTION OF THE DRAWINGS

Other features and advantages of the present invention will become apparent in the following detailed description of the preferred embodiments with reference to the accompanying drawings, of which:

FIG. 6 is a flow chart of steps of a method for acquiring the code phase shift between the input sequence and the reference sequence according to the third preferred embodiment;

FIGS. 7 to 9 illustrate simulation results of the invention when the code sequence is partitioned once;

FIGS. 10 to 12 are illustrate simulation results of the invention when the code sequence is partitioned twice.

DETAILED DESCRIPTION OF THE PREFERRED EMBODIMENTS

Figure 1:
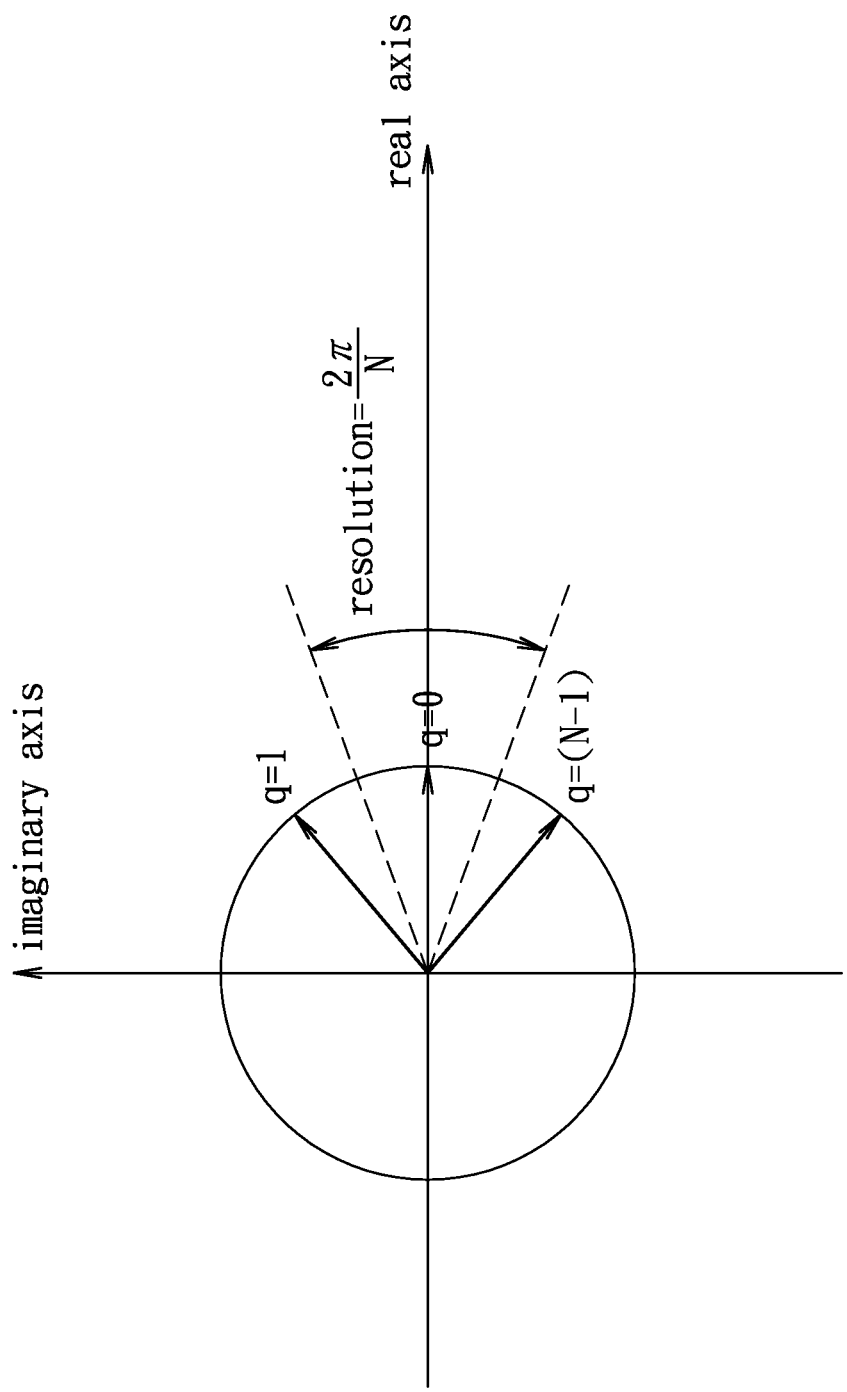
FIG. 1 is a schematic plot illustrating different phase resolutions of a cross correlation signal in complex domain.

Before the present invention is described in greater detail, it should be noted that like elements are denoted by the same reference numerals throughout the disclosure.

In a general signal processing system, a signal sent by a transmitter is received by a receiver as an input sequence. The receiver is configured to compute a phase shift between the input sequence and a reference sequence, which is useful in many aspects, such as signal synchronization and data analysis. It is worth noting that, throughout this disclosure, both the input sequence and the reference sequence are pseudo random (PN) sequences.

The input sequence (A) has a number (N) of bits $\{x_0, x_1, x_2 \ldots, x_{N-1}\}$, and the reference sequence (B) has the number (N) of bits $\{y_0, y_1, y_2 \ldots, y_{N-1}\}$. The input sequence (A) and the reference sequence (B) can be transformed into an input signal (X) with a complex phase and a reference signal (Y) with a complex phase, respectively. A phase coherent indicator (U) can be obtained by computing a phase relationship between the input signal (X) and the reference signal (Y), and can be expressed as:

$$X = \sum_{k=0}^{N-1} x_k \cdot \alpha^{-k} \quad (1)$$

$$Y = \sum_{k=0}^{N-1} y_k \cdot \alpha^{-k} \quad (2)$$

$$\begin{aligned}
U &= X \cdot Y^* \\
&= \left(\sum_{k=0}^{N-1} x_k \cdot \alpha^{-k}\right) \cdot \left(\sum_{l=0}^{N-1} y_l \cdot \alpha^l\right) \\
&= \left(\sum_{k=0}^{N-1} x_k \cdot \alpha^{-k}\right) \cdot \left(\sum_{m=0}^{N-1} y_{k+m} \cdot \alpha^{k+m}\right) \\
&= |U|e^{j\psi}
\end{aligned} \quad (3)$$

where $\alpha = e^{j\frac{2\pi}{N}}$, and $|U|$ and $\Psi$ represent the magnitude and the phase of the phase coherent indicator (U), respectively.

Then, the cross-correlation between the input sequence (A) and the reference sequence (B) with an offset of a number (m) of bits can be expressed as $$R(m) = \sum_{k=0}^{N-1} x_k y_{k+m}.$$

It is assumed that R(q) is one of the R(0) to R(n−1) that has a greatest magnitude. From the Maximum-Length Sequence (MLS) theory, R(m)=N when m=q, and R(m)=−1 when otherwise. The Equation (3) can thus be rearranged as:

$$\begin{aligned}
U &= \sum_{m=0}^{N-1} \alpha^m \cdot R(m) \\
&= R(q) \cdot \alpha^q + \sum_{\substack{m=0 \\ m \neq q}}^{N-1} R(m)^m \\
&= N \cdot \alpha^q - \sum_{\substack{m=0 \\ m \neq q}}^{N-1} \alpha^{(m)} \\
&= N \cdot \alpha^q + \alpha^q \\
&= (N+1) \cdot e^{j\frac{2\pi}{N}q}
\end{aligned} \quad (4)$$

Comparing Equations (3) and (4), it can be derived that $$\psi = \frac{2\pi}{N} \cdot q,$$

which can be mapped onto a complex plane with a phase resolution of $$\frac{2\pi}{N}$$

as shown in FIG. 1. Namely, when the phase of the phase coherent indicator (U) is between $$\left(\frac{2\pi}{N} \cdot q - \frac{\pi}{N}\right) \text{ and } \left(\frac{2\pi}{N} \cdot q + \frac{\pi}{N}\right),$$

the code phase shift between the input sequence (A) and the reference sequence (B) is equal to q. This computational procedure is relatively simpler than computation of the conventional convolution method.

However, the phase resolution is decreased as the number (N) of bits of the input sequence increases. That is, when the number (N) is large, deviation between adjacent phases is small and leads to erroneous phase shift estimation. In such cases, accuracy of the phase shift estimation may be sensitive to noise during transmission.

In order to address the noise problem, it is proposed that the input sequence (A) be partitioned into a plurality of shorter sequences, such that the noise sensitivity can be reduced and reliability of the method can be enhanced.

For example, the input sequence (A) may be partitioned into a number ($K_1$) of first input sequence groups ($A_i$) each having a number ($M_1$) of bits, and the reference sequence (B) may be partitioned into the number ($K_1$) of first reference sequence groups ($B_i$) each having the number ($M_1$) of bits, where $N=K_1 \times M_1$. In particular, the first input sequence groups ($A_i$) and the first reference sequence groups ($B_i$) can be expressed as $$A_0 = \{x_0, x_{K_1}, x_{2K_1}, \ldots, x_{(M_1-1)K_1}\} \quad (5)$$
$$A_1 = \{x_1, x_{K_1+1}, x_{2K_1+1}, \ldots, x_{(M_1-1)K_1+1}\}$$
$$A_2 = \{x_2, x_{K_1+2}, x_{2K_1+2}, \ldots, x_{(M_1-1)K_1+2}\}$$
$$\ldots$$
$$A_{K_1-1} = \{x_{K_1-1}, x_{2K_1-1}, x_{3K_1-1}, \ldots, x_{N-1}\},$$

and $$B_0 = \{y_0, y_{K_1}, y_{2K_1}, \ldots, y_{(M_1-1)K_1}\} \quad (6)$$
$$B_1 = \{y_1, y_{K_1+1}, y_{2K_1+1}, \ldots, y_{(M_1-1)K_1+1}\}$$
$$B_2 = \{y_2, y_{K_1+2}, y_{2K_1+2}, \ldots, y_{(M_1-1)K_1+2}\}$$
$$\ldots$$
$$B_{K_1-1} = \{y_{K_1-1}, y_{2K_1-1}, y_{3K_1-1}, \ldots, y_{N-1}\}.$$

Each of the first input sequence groups ($A_i$) can be transformed into a first input signal group ($X_i$) with a complex phase, and each of the first reference sequence groups ($B_i$) can be transformed into a first reference signal group ($Y_i$) with a complex phase. It should be noted that the code phase shift (q) can be computed based upon $q=c_1 K_1 + d_1$, where ($c_1$) and ($d_1$) represent a first shift number and a first group parameter, respectively. The details about the first shift number ($c_1$) and the first group parameter ($d_1$) will be described in the succeeding paragraphs.

Equations (7) and (8) describe the corresponding expressions of the first input signal group ($X_i$) and the first reference signal group ($Y_i$).

$$X_i = \sum_{n_1=0}^{M_1-1} x_{n_1 K_1 + i} \beta^{-n_1} = |X_i| e^{j\theta_i}, \quad (7)$$

and $$Y_i = \sum_{n_1=0}^{M_1-1} y_{n_1 K_1 + i} \beta^{-n_1} = |Y_i| e^{j\phi_i}, \quad (8)$$

In Equations (7) and (8), $i=0 \sim (K_1-1)$, $$\beta = e^{j\frac{2\pi}{M_1}},$$

$|X_i|$ and $\theta_i$ represent the magnitude and the phase of the first input signal group ($X_i$), and $|Y_i|$ and $\phi_i$ represent the magnitude and the phase of the first reference signal group ($Y_i$).

Subsequently, a first indicator ($G_{m_1}$) can be obtained by computing a phase relationship between the first input sequence groups ($A_{i+m_1}$) and the first reference sequence groups, ($B_i$), with an offset of a number ($m_1$) of bits, where $m_1=0 \sim (K_1-1)$. Thus, a plurality of the first indicators ($G_0$) to ($G_{k-1}$) can be expressed by Equation (9).

$$G_{m_1} = \sum_{i=0}^{K_1-m_1-1} e^{j(\phi_i - \theta_{i+m_1})} + \sum_{i=K_1-m_1}^{K_1-1} e^{j(\phi_i - \theta_{i+m_1} - \frac{2\pi}{M_1})} \quad (9)$$

It can be derived that, when the number ($m_1$) is equal to the first group parameter ($d_1$), i.e., $m_1 = d_1$, exponential components in first indicator ($G_{d_1}$) have an identical phase $$\left(\frac{2\pi}{M_1} \cdot c_1\right).$$

Further, a magnitude of the first indicator $|G_{d_1}|$ is greater than magnitudes of the rest of the first indicators $|G_{m_1 \ne d_1}|$. Thus, the first indicator ($G_{d_1}$) can be expressed as $$G_{d_1} = \sum_{i=0}^{K_1-d_1-1} e^{j(\phi_i - \theta_{i+d_1})} + \sum_{i=K_1-m_1}^{K_1-1} e^{j(\phi_i - \theta_{i+d_1} - \frac{2\pi}{M_1})}, \quad (10)$$
$$= K_1 \cdot e^{j\frac{2\pi}{M_1} \cdot c_1}$$
$$= |G_{d_1}| \cdot e^{j\Omega_1}.$$

In Equation (10), since the exponential components of the first phase coherent indicator ($G_{d_1}$) have the same phase $$\left(\frac{2\pi}{M_1} \cdot c_1\right),$$

the exponential components can be added up altogether and result in a largest magnitude among those of the first indicators ($G_{m_1}$, $m_1 \ne d_1$) in Equation (9). In particular, the first shift number $c_1$ ranges from 0 to $m_1$, and the first input sequence groups ($A_{i+m_1}$) may conform with the corresponding first reference sequence groups ($B_i$) as being offset by the first shift number ($c_1$) of bits.

By virtue of this property, the code phase shift (q) can be obtained by identifying the first group parameter ($d_1$) that results in the first indicator ($G_{d_1}$) with the largest magnitude $|G_{d_1}|$, and subsequently using the phase ($\Omega_1$) of the first phase coherent indicator ($G_{d_1}$) to compute ($c_1$), based upon $$c_1 = \frac{\Omega_1}{2\pi} \cdot M_1.$$

Then, the phase shift (q) can be computed based upon $q=c_1K_1+d_1$.

It can be seen that the phase resolution is given by $$\frac{2\pi}{N}$$

before partitioning of the input sequence (A) and the reference sequence (B), and by $$\frac{2\pi}{M_1}$$

afterward. Since N is $K_1$ times larger than $M_1$, the phase resolution is enlarged by the same ratio, and the noise sensitivity is effectively reduced.

Moreover, in an environment with extremely great noise, a single partition may not improve the accuracy sufficiently, and therefore, a second partition can be applied to the first input sequence groups ($A_i$) and the first reference sequence groups ($B_i$). In this procedure, after offsetting each of the first input sequence groups ($A_i$) (see Equation (5)) by the first group parameter ($d_1$), each of the shifted first input sequence groups ($A_i$) and each of the first reference sequence groups ($B_i$) are further partitioned. In particular, the offset procedure in this case involves a circular offset procedure, each of the updated first input sequence groups ($A_i$) is further partitioned into a number ($K_2$) of second input sequence groups $\{A_{i,0}, A_{i,1}, A_{i,2} \ldots, A_{i,(K_2-1)}\}$ each including a number ($M_2$) of bits, and each of the first reference sequence groups ($B_i$) is partitioned into the number ($K_2$) of second reference sequence groups $\{B_{i,0}, B_{i,1}, B_{i,2} \ldots, B_{i,(K_2-1)}\}$ each including the number ($M_2$) of bits, where $M_1=K_2 \times M_2$. In this case, the code phase shift (q) can be computed based upon $q=(c_2K_2+d_2)K_1+d_1$, where $c_2$ and $d_2$ represent a second shift number and a second group parameter, respectively. The details about the second shift number ($c_2$) and the second group parameter ($d_2$) will be described in the succeeding paragraphs.

Each of the second input sequence groups ($A_{i,j}$, $j=(0\sim K_2-1)$) and the second reference sequence groups ($B_{i,j}$, $j=(0\sim K_2-1)$) can be transformed into second input signal groups ($X_{i,j}$) with complex phases and second reference signal groups ($Y_{i,j}$) with complex phases, respectively. The second input signal group ($X_{i,j}$) and the second reference signal group ($Y_{i,j}$) can be expressed by Equations (11) and (12).

$$X_{i,j} = \sum_{n_2=0}^{M_2-1} x_{(n_2K_1K_2+jK_1+(i+d_1))modN} r^{-n_2} = |X_{i,j}|e^{j\theta_{i,j}} \quad (11)$$

$$Y_{i,j} = \sum_{n_2=0}^{M_2-1} y_{n_2K_1K_2+jK_1+i} r^{-n_2} = |Y_{i,j}|e^{j\phi_{i,j}} \quad (12)$$

In Equations (11) and (12), $n_2=0\sim(M_2-1)$, $M_1=K_2\times M_2$, $0 \le j \le (K_2-1)$, $$r = e^{j\frac{2\pi}{M_2}},$$

and mod represents modulus arithmetic.

Those skilled in art can readily appreciate that, the code phase shift (q) is given by $q=c_1K_1+d_1$, and ($c_1$) is given by $c_1=c_2K_2+d_2$. In particular, the second input sequence groups ($A_{i,j+m_2}$) conform with the second reference sequence groups ($B_{i,j}$) as being offset by the second shift number ($c_2$) of bits. Similar to the above description concerning the partition of the input sequence (A) and the reference sequence (B), a second indicator can be obtained by comparing one of the second input sequence groups ($A_{i,j+m_2}$) and a corresponding one of the second reference sequence groups ($B_{i,j}$) with an offset of a number ($m_2$) of bits, where $m_2=0\sim(K_2-1)$. Thus, a plurality of the second indicators can be obtained, and each of the second indicators is computed based on a respective permutation of the second input signal groups ($X_{i,j}$) with a particular order and a corresponding permutation of the second reference signal groups ($Y_{i,j}$). Then, for each of the numbers ($m_2$), the second indicator function ($G_{m_2}^{(2)}$) is expressed by Equation (13), and an absolute value of a magnitude of the second indicator $|G_{m_2}^{(2)}|$ is computed and serves as a characteristic signal ($W_{m_2}$) as expressed by Equation (14).

$$G_{m_2}^{(2)} = \sum_{i=0}^{K_1-1} \left[ \sum_{j=0}^{K_2-m_2-1} e^{j(\phi_{i,j}-\theta_{i,j+m_2})} + \sum_{j=K_2-m_2}^{K_2-1} e^{j(\phi_{i,j}-\theta_{i,j+m_2}-\frac{2\pi}{M_2})} \right] \quad (13)$$

$$W_{m_2} = |G_{m_2}^{(2)}| \le |G_{d_2}^{(2)}| \quad (14)$$

In Equation (14), it is assumed that, when the number ($m_2$) is equal to a second group parameter ($d_2$) (i.e., $m_2=d_2$), a corresponding one of the second indicators ($G_{d_2}^{(2)}$) has a greatest absolute value of the magnitude) $|G_{d_2}^{(2)}|$. In particular, the second phase coherent indicator ($G_{d_2}^{(2)}$) can be expressed as Equation (15) under a noiseless environment. In Equation (15), $\Omega_2$ is a phase of the second phase coherent indicator ($G_{d_2}^{(2)}$), and thus, a second shift number ($c_2$) can be obtained based upon $$c_2 = \frac{\Omega_2}{2\pi} \cdot M_2.$$

It should be noted that, the second shift number ($c_2$) ranges from 0 to $M_2$, and the second input sequence group ($A_{i,j+m_2}$) conforms with the corresponding second reference sequence group ($B_i$) as being offset by the second shift number ($B_{i,j}$) of bits.

$$G_{d_2}^{(2)} = |G_{d_2}^{(2)}|e^{j\Omega_2} = K_1 \cdot K_2 \cdot e^{j\frac{2\pi}{M_2}c_2} \quad (15)$$

Therefore, the code phase shift (q) can be computed based upon $q=c_1K_1+d_1=(c_2K_1+d_2)K_1+d_1$. The resulting phase resolution in this procedure is further enlarged to $$\frac{2\pi}{M_2},$$

and is even more noise-resistant.

Figure 5:
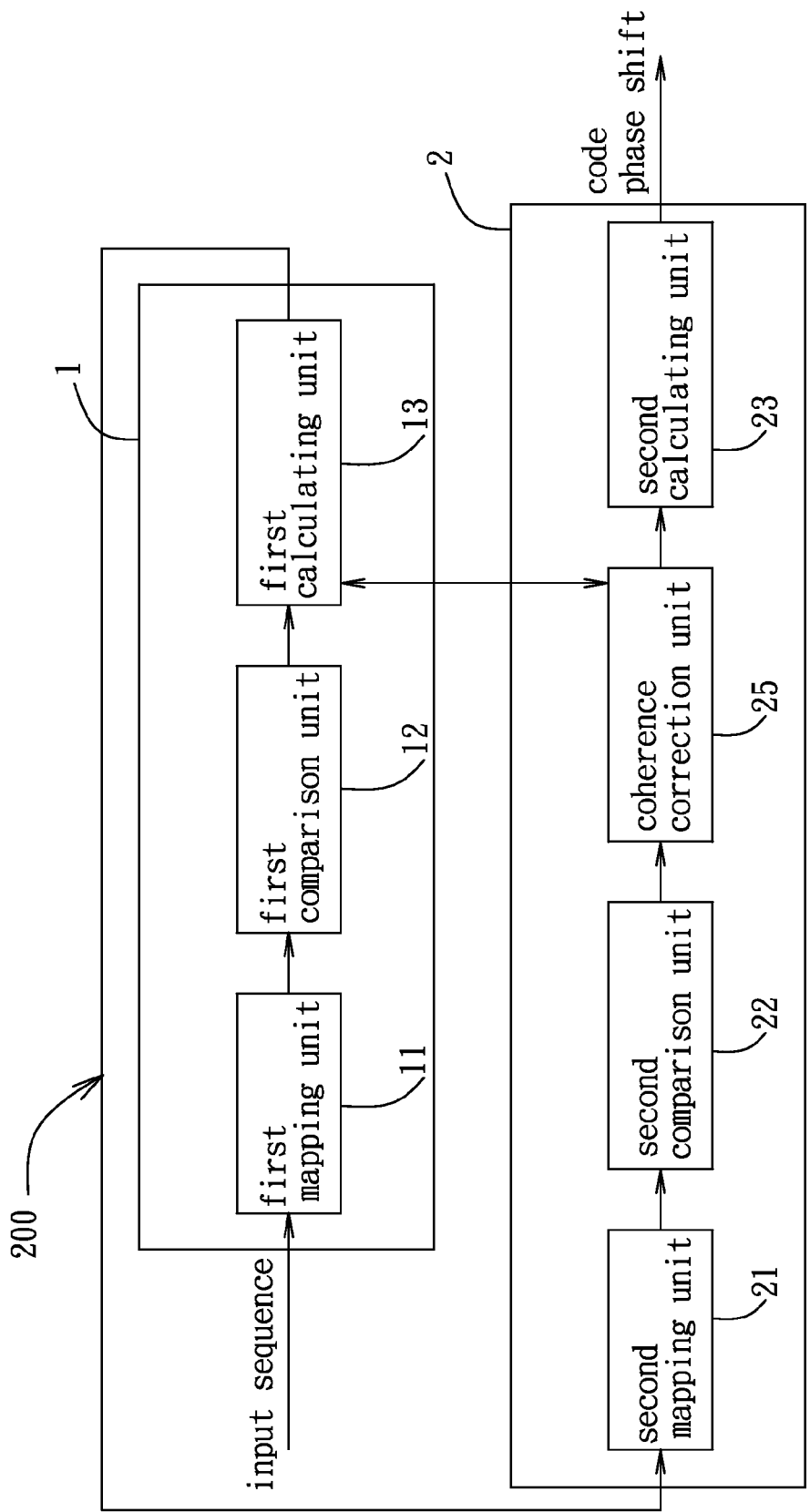
FIG. 5 is schematic block diagram of a third preferred embodiment of an acquisition device according to this invention.

Additionally, in order to ensure the first group parameter ($d_1$) is correctly selected (i.e., selection of the first group parameter ($d_1$) is not disturbed by noise), a coherence correction procedure can be implemented by hardware (for example, a coherence correction unit 25 of FIG. 5). The detailed operation of the procedure will be described in the succeeding paragraphs.

Figure 2:
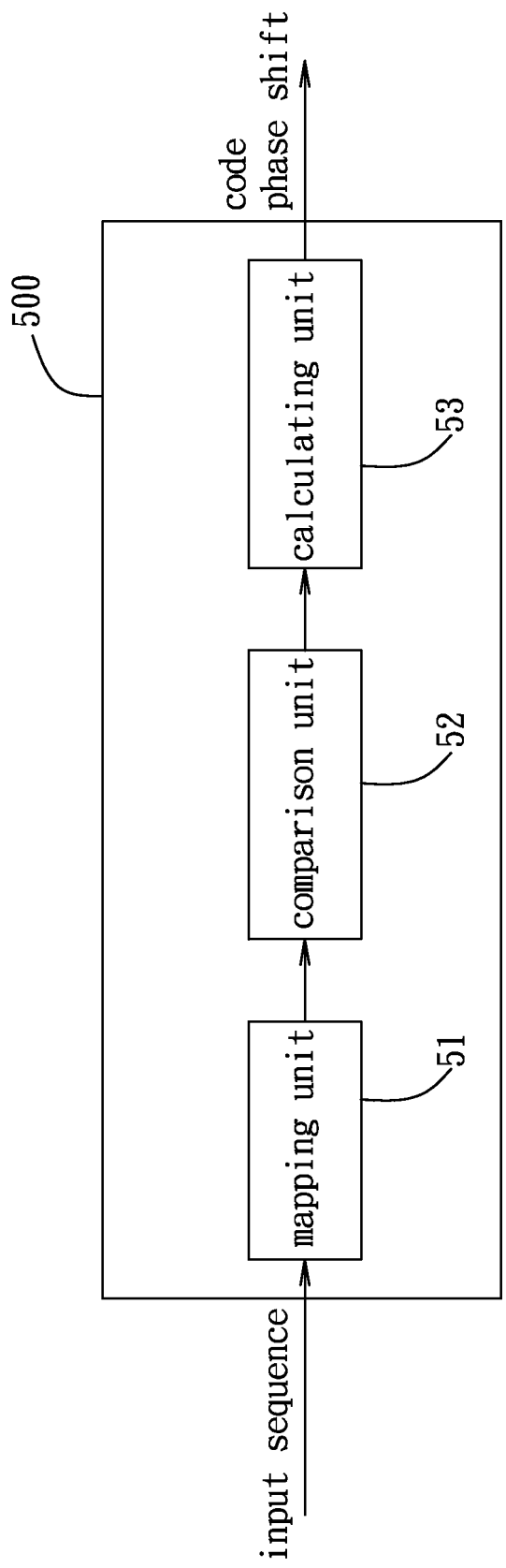
FIG. 2 is a schematic block diagram of a first preferred embodiment of an acquisition device according to the invention.

Reference is now made to FIG. 2 illustrating the first preferred embodiment of an acquisition device 500 according to the present invention.

The acquisition device 500 includes a mapping unit 51, a comparison unit 52 and a calculating unit 53. The acquisition device 500 is operable to select one of three available processing procedures according to the noise of the environment.

In a first processing procedure, the input sequence (A) and the reference sequence (B) are not partitioned. The mapping unit 51 is operable to transform the input sequence $A=\{x_0, x_1, x_2 \ldots, x_{N-1}\}$ into an input signal (X) with a complex phase, and to transform the reference sequence $B=\{y_0, y_1, y_2 \ldots, y_{N-1}\}$ into a reference signal with a complex phase based upon Equation (1). The comparison unit 52 is operable to compare the input signal (X) with the reference signal (Y) so as to obtain a phase coherent indicator (U) based on Equation (3). The calculating unit 53 is operable to obtain the code phase shift (q) between the input sequence (A) and the reference sequence (B) based on a phase of the phase coherent indicator (U) and a number (N) of bits of the input sequence (A) according to Equation (4). In particular, when the phase of the phase coherent indicator is between $$\left(\frac{2\pi}{N}\cdot q - \frac{\pi}{N}\right) \text{ and } \left(\frac{2\pi}{N}\cdot q + \frac{\pi}{N}\right),$$

the calculating unit 53 is configured to compute the code phase shift between the input sequence (A) and the reference sequence (B) as (q), where $0 \leq q < N$.

In a second processing procedure, the input sequence (A) and the reference sequence (B) are partitioned once. The input sequence (A) is partitioned and transformed into ($K_1$) of first input signal groups $\{X_0, X_1, X_2 \ldots, X_{K_1-1}\}$ each including a number ($M_1$) of bits ($x_{n_1 K_1+i}$) by the mapping unit 51, and the reference sequence (B) is partitioned and transformed into the number ($K_1$) of first reference signal groups $\{Y_0, Y_1, Y_2 \ldots, Y_{K_1-1}\}$ each including the number ($M_1$) of bits ($y_{n_1 K_1+i}$) by the mapping unit 51, where $n_1=0 \sim (M_1-1)$, $N=K_1 \times M_1$ and $i=0 \sim (K_1-1)$. The comparison unit 52 is operable to obtain a plurality of first indicators ($G_{m_1}$) based upon Equations (7) to (9). Each of the first indicators ($G_{m_1}$) is based on a respective permutation of the first input signal groups ($X_i$) with a particular order and a corresponding permutation of the first reference signal groups ($Y_i$) with an offset of a specified number ($m_i$) from the first input signal groups ($X_i$).

For example, for a set of input and reference sequences that each have 15 bits (i.e., N=15), five ($K_1=5$) first input signal groups and first reference signal groups are obtained by the mapping unit 51, each having three ($M_1=3$) bits. The comparison unit 52 is then operable to obtain five of the first indicators ($G_0$ to $G_4$). Based on Equation (9), one of the first indicators ($G_0$) is computed baSed on the respective permutation of the first input signal groups ($X_i$) and the corresponding permutation of the first reference signal groups ($Y_i$) with an offset of 0 bits from the first input signal groups ($X_i$). The respective permutation of the first input signal groups ($X_i$) for the first indicator ($G_0$) is expressed as $\{X_0, X_1, X_2, X_3, X_4\}$, and accordingly, the corresponding permutation of the first reference signal groups ($Y_i$) for the first indicator ($G_0$) is $\{Y_0, Y_1, Y_2, Y_3, Y_4\}$. Similarly, the first indicator ($G_1$) may be computed based on another permutation of the first input signal groups ($X_i$) (e.g., $\{X_4, X_0, X_1, X_2, X_3\}$) and another permutation of the first reference signal groups ($Y_i$) (e.g., $\{Y_0, Y_1, Y_2, Y_3, Y_4\}$).

The calculating unit 53 is operable to identify one of the first indicators ($G_{d_1}$) with a largest magnitude serving as the first phase coherent indicator. The calculating unit 53 is further configured to compute, when said first phase coherent indicators ($G_{d_1}$) with the largest magnitude has a phase between $$\left(\frac{2\pi}{M_1}\cdot c_1 - \frac{\pi}{M_1}\right) \text{ and } \left(\frac{2\pi}{M_1}\cdot c_1 + \frac{\pi}{M_1}\right)$$

and is based upon the first input signal groups and the first reference signal groups with an offset of a number ($d_1$) of bits from the first input signal groups, the code phase shift (q) based upon $q=c_1 K_1+d_1$, where $0 \leq d_1 < (K_1-1)$, and $0 \leq c_1 < m_1$.

In a third processing procedure, the input sequence (A) and the reference sequence (B) are partitioned twice. The mapping unit 51 is operable to partition and transform each first input sequence groups ($A_i$) into a number ($K_2$) of second input signal groups ($X_{i,j}$) with complex phases, and to partition and transform each of the first reference sequence groups ($B_i$) into the number ($K_2$) of second reference signal groups ($Y_{i,j}$) with complex phases. Each of the second input signal groups ($X_{i,j}$) includes a number $M_2$ of bits of the second input sequence groups ($x(n_2 K_1 K_2+jK_1+(z_1-d_1))\mathrm{mod}N$) based on Equation (11), and each of the second reference signal groups ($Y_{i,j}$) includes the number ($M_2$) bits of the second reference sequence ($y_{n_2 K_1 K_2}+jK_1+z_1$) based upon Equation (12), where $n_2=0 \sim (M_2-1)$ $M_1=K_2 \times M_2$, $0 \leq j \leq (K_2-1)$ and $z_1$ indicates a part of the first input signal groups ($X_i$) associated with said one of the first indicators ($G_{z_1}$) with the largest magnitude. The comparison unit 52 is operable to obtain a plurality of second indicators. Each of the second indicators is computed based on a respective permutation of the second input signal groups ($X_{i,j}$) and a corresponding permutation of the second reference signal groups ($Y_{i,j}$) with an offset of a specified number $m_2$ of bits from to second input signal groups ($X_{i,j}$).

The calculating unit 53 is operable to identify one of the second indicators with a largest magnitude, and to compute the code phase shift (q) based upon $(c_2 K_2+d_2)K_1+d_1$ when said one of the second indicators with the largest magnitude has a phase between $$\left(\frac{2\pi}{M_2}\cdot c_2 - \frac{\pi}{M_2}\right) \text{ and } \left(\frac{2\pi}{M_2}\cdot c_2 + \frac{\pi}{M_2}\right)$$

and is based on the second input signal groups ($X_{i,j}$) and the second reference signal groups ($Y_{i,j}$) with an offset of a number ($d_2$) of bits from the second input signal groups ($X_{i,j}$), where $0 \leq d_2 < K_2$, and $0 \leq c_2 < M_2$. Said one of the second input signal groups ($X_{i,j}$) and said corresponding one of the second reference signal groups ($Y_{i,j}$) are offset with each other by a second shift number ($c_2$) of bits.

Figure 3:
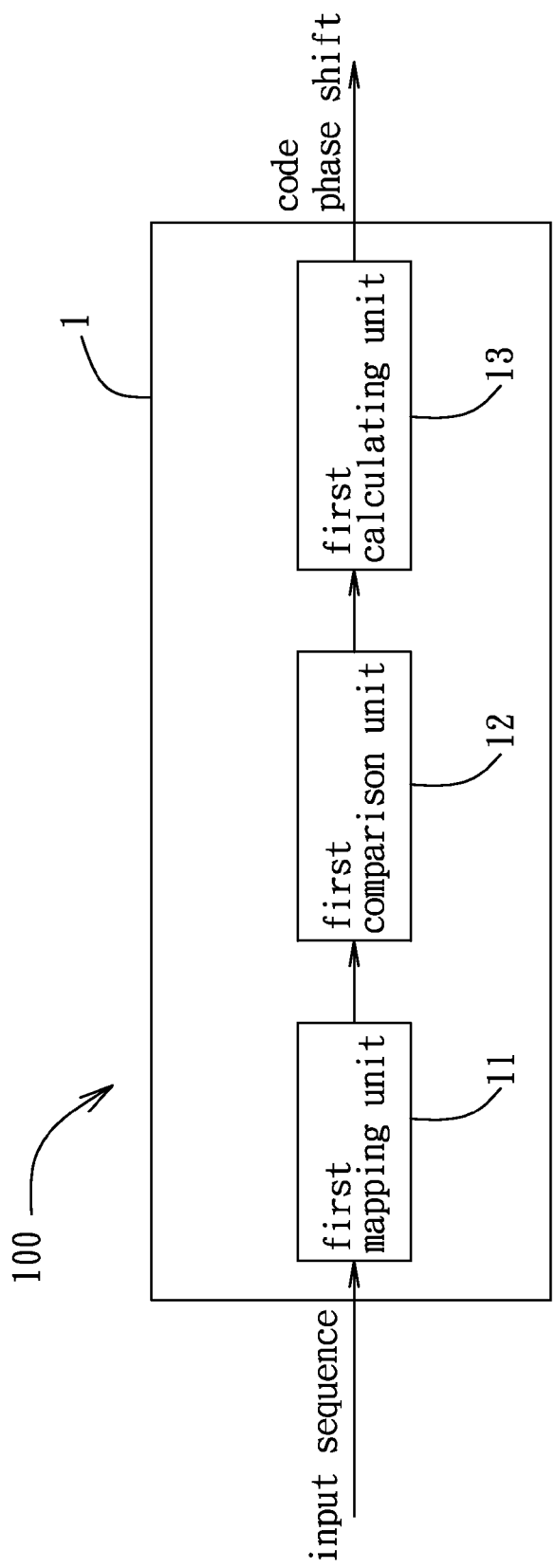
FIG. 3 is a schematic block diagram of a second preferred embodiment of an acquisition device according to this invention.

Reference is now made to FIG. 3 illustrating the second preferred embodiment of an acquisition device 100 according to the present invention.

The acquisition device 100 includes a first extraction circuit 1, which has a first mapping unit 11, a first comparison unit 12 and a first calculating unit 13.

Figure 4:
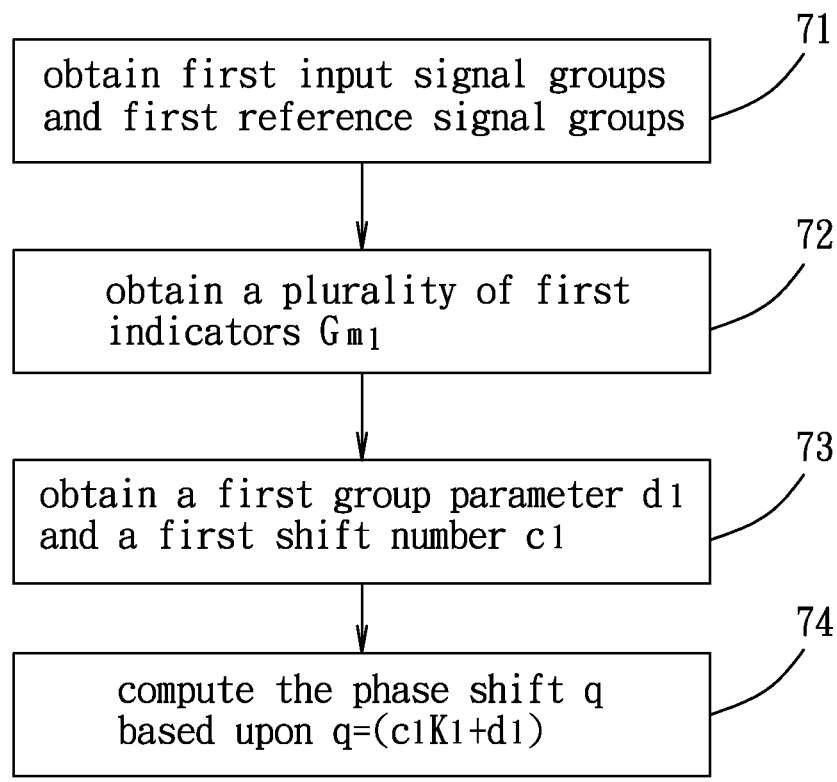
FIG. 4 is a flow chart of a method for acquiring a code phase shift between an input sequence and a reference sequence according to the second preferred embodiment.

Further referring to FIG. 4, the acquisition device 100 is operable to implement a method for acquiring the code phase shift (q) between the input sequence $A=\{x_0, x_1, x_2 \ldots, x_{N-1}\}$ and the reference sequence B={$y_0, y_1, y_2 \ldots, y_{N-1}$}. Steps of the method will now be described in the following.

In step 71, the first mapping unit 11 is operable, based on Equation (7) and (8), to partition the input sequence (A) into first input sequence groups ($A_i$) and to transform the first input sequence ($A_i$) into first input signal groups ($X_i$) with complex phases, and to partition the reference sequence (B) into first reference sequence groups ($B_i$) and to trans form the first reference sequence groups ($B_i$) into first reference signal groups ($Y_i$) with complex phases. Specifically, the input sequence (A) is partitioned and transformed into $K_1$ of first input signal groups {$X_0, X_1, X_2 \ldots, X_{K_1-1}$} each including a number ($M_1$) of bits ($x_{n_1K_1+i}$) by the first mapping unit 11, and the reference sequence (B) is partitioned and transformed into the number ($K_1$) of first reference signal groups {$Y_0, Y_1, Y_2 \ldots, Y_{K_1-1}$} each including the number ($M_1$) of bits ($y_{n_1K_1+i}$) by the first mapping unit 11, where $n_1=0\sim(M_1-1)$, $N=K_1 \times M_1$ and $i=0\sim(K_1-1)$.

In step 72, the first comparison unit 12 is operable to obtain, based on Equation (9), a plurality of first indicators ($G_{m_1}$). Each of the first indicators ($G_{m_1}$) is computed based on a respective permutation of the first input signal groups and a corresponding permutation of the first reference signal groups with an offset of a number $m_1$ of bits from the first input signal groups, where $m_1=0\sim(K_1-1)$.

In step 73, the first calculating unit 13 is operable to obtain a first group parameter ($d_1$) by selecting one of the numbers ($m_1$) that results in one of the first indicators ($G_{m_1}$) with a largest magnitude, and is operable to compute the first shift number $c_1$ based upon $$c_1 = \frac{\Omega_1}{2\pi} \cdot M_1,$$

where $\Omega_1$ is a phase of said first phasor coherence indicator ($G_{d_1}$) with the largest magnitude. It is worth noting that, the first shift number ($c_1$) thus obtained may not be an integer due to interference during signal transmission. In this embodiment, a floor function is applied to transfer the first shift number ($c_1$) to an integer. Other round-up functions, such as a ceiling function and a round half up function, can be applied in other embodiments.

In step 74, the first calculating unit 13 is operable to compute the phase shift (q) based upon $q=c_1K_1+d_1$.

Reference is now made to FIG. 5 illustrating the third preferred embodiment of an acquisition device 200 according to the present invention.

The acquisition device 200 includes a first extraction circuit 1 and a second extraction circuit 2. The second extraction circuit 2 has a second mapping unit 21, a second comparison unit 22, a second calculating unit 23 and a coherence correction unit 25.

Further referring to FIG. 6, the acquisition device 200 is operable to implement a method for acquiring the code phase shift (q) between the input sequence A={$x_0, x_1, x_2 \ldots, x_{N-1}$} and the reference sequence B={$y_0, y_1, y_2 \ldots, y_{N-1}$}. Steps of the method will be described in the following.

In step 81, the first mapping unit 11 is operable to partition the input sequence (A) into the number $K_1$ of the first input sequence groups ($A_i$) and to transform the first input sequence groups ($A_i$) into the number $K_1$ of first input signal groups ($X_i$) with complex phases, and to partition the reference sequence (B) into the number $K_1$ of first reference sequence groups ($B_i$) and to transform the first reference sequence groups ($B_i$) into the number $K_1$ of first reference signal groups ($Y_i$) with complex phases based on Equation (7) and (8). Specifically, the input sequence (A) is partitioned and transformed into ($K_1$) of first input signal groups {$X_0, X_1, X_2 \ldots, X_{K_1-1}$} each including a number ($M_1$) of bits ($x_{n_1K_1+i}$) by the first mapping unit 11, and the reference sequence (B) is partitioned and transformed into the number ($K_1$) of first reference signal groups {$Y_0, Y_1, Y_2 \ldots, Y_{K_1-1}$} each including the number ($M_1$) of bits ($y_{n_1K_1+i}$) after the mapping unit 11, where $n_1=0\sim(M_1-1)$, $N=K_1 \times M_1$ and $i=0\sim(K_1-1)$.

In step 82, the first comparison unit 12 is operable to obtain, based on Equation (9), a plurality of first indicators ($G_{m_1}$). Each of the first indicators ($G_{m_1}$) is computed based on a respective permutation of the first input signal groups ($X_i$) and a corresponding permutation of the first reference signal groups ($Y_i$) with an offset of a number $m_1$ of bits from the first input signal groups ($X_i$), where $m_1=0\sim(K_1-1)$.

In step 83, the first calculating unit 13 is operable to select from the first indicators ($G_{m_1}$) a number S (S>1) of first indicators ($G_{m_1}$) having relatively large magnitudes, and to obtain a first group parameter ($d_1$) by selecting one of the numbers ($m_1$) that is associated with the first phase coherent indicator ($G_{d_1}$) with a largest magnitude.

In step 84, the second mapping unit 21 is operable to partition and transform, based upon Equation (11), each of the first input sequence groups ($A_i$) into a number ($K_2$) of second input signal groups {($X_{i,0}, X_{i,1}, X_{i,2} \ldots, X_{i,(K_2-1)}$)} each including a number ($M_2$) of bits $x_{(n_2K_1K_2+jK_1+(i+d_1))modN}$, and to partition and transform, based upon Equation (12), each of the first reference sequence groups ($B_i$) into a number ($K_2$) of second reference signal groups {$Y_{i,0}, Y_{i,1}, Y_{i,2} \ldots, Y_{i,(K_2-1)}$} each including the number ($M_2$) of bits $y_{n_2K_1K_2}+jK_1+i$, where $M_1=K_2 \times M_2$, $n_2=0\sim(M_2-1)$, $j=0\sim k_2$, mod represents modulus arithmetic.

In step 85, the second comparison unit 22 is operable to obtain a plurality of second indicators, each of which is computed based on a respective permutation of the second input signal groups ($X_{i,j}$) and a corresponding permutation of the second reference signal groups ($Y_{i,j}$) with an offset of a number ($m_2$) of bits therebetween. Then, the second comparison unit 22 is operable, based on Equations (13) and (14), to obtain second indicators ($G_{m_2}^{(2)}$) and a characteristic signal ($W_{m_2}$) corresponding to the second indicators ($G_{m_2}^{(2)}$) for each of the number ($m_2$), where $m_2=0\sim(K_2-1)$.

In step 86, the coherence correction unit 25 is operable to execute the coherence correction procedure by identifying one of the characteristic signals ($W_{m_2}$) with a largest magnitude. The flow goes to step 87 when the largest value is not larger than a predetermined threshold value, and goes to step 88 when otherwise. In step 87, the coherence correction unit 25 is operable to select another one of the numbers ($m_1$) as a new first group parameter ($d_1$) that is associated with one of the numbers (S) of the first indicators ($G_{m_1}$) that is selected in step 83 having the second largest magnitude. The flow then goes back to step 89.

The purpose of this verification procedure (i.e., the coherence correction procedure) is to ensure that the first group parameter ($d_1$) thus selected is correct, since in ideal cases, when the first group parameter ($d_1$) is optimal, the magnitude of the corresponding characteristic signal ($W_{m_2}$) equals $K_1 \times K_2$. The characteristic signal ($W_{m_2}$) may have a significantly smaller value when the first group parameter ($d_1$) is net correctly selected in step 83.

In step 88, the second calculating unit 23 is operable to obtain a second group parameter ($d_2$) by selecting one of the numbers ($m_2$) that results in said one of the characteristic signals ($W_{d_2}$) with the largest magnitude, and is operable to compute the second shift number ($c_2$) based upon $$c_2 = \frac{\Omega_2}{2\pi} \cdot M_2.$$

Similar to step 73, the second shift number ($c_2$) is transferred to an integer, as previously described, if not.

In step 89, the second calculating unit 23 is operable to compute the code phase shift (q) based upon $g=c_1K_1+d_1=(c_2K_1+d_2)K_1+d_1$.

In order to verify the performance of the method of this invention, Monte Carlo simulation was executed with 1000 trials. For the simulation, N is $2^{16}-1$, $K_1=2^8+1$, $M_1=2^8-1$, $K_2=2^4+1$, and $M_2=2^4-1$. FIGS. 7 and 8 illustrate correct rates of the first group parameter ($d_1$) and the first shift number ($c_1$) when the input sequence (A) and the reference sequence (B) are partitioned once. It can be seen that the correct rate of the first shift number ($c_1$) is only about 0.1 to 0.2 when the signal-to-noise ratio (SNR) is −5 dB, and the standard deviation (STD) of the code phase shift (q), as shown in FIG. 9, is 4. The results indicate that in a noisy environment, the input sequence (A) and the reference sequence (B) must be partitioned twice for better performance.

Figure 10:
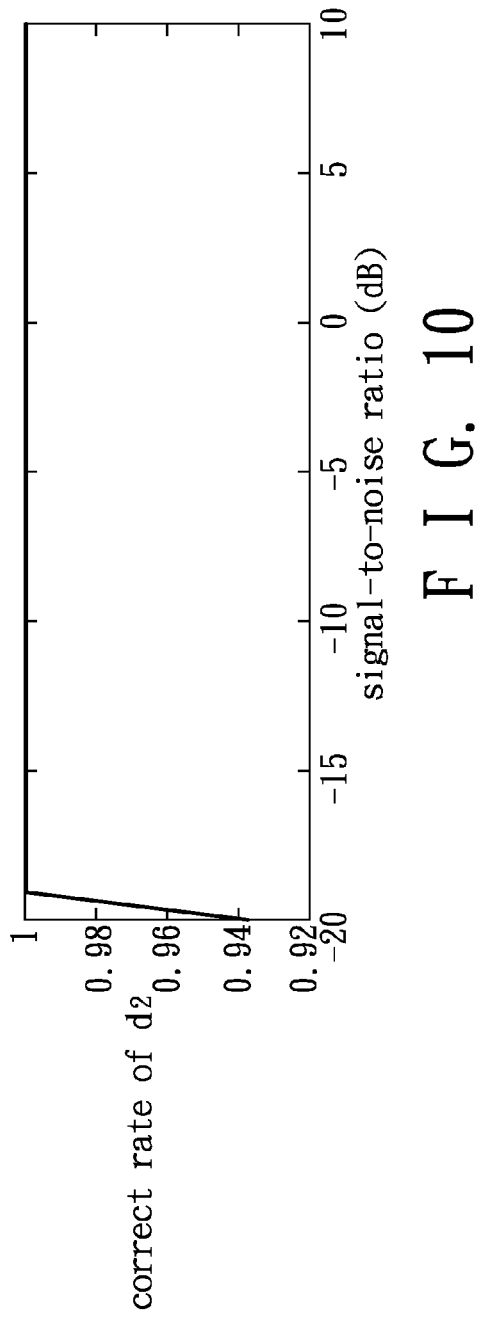
Figure 11:
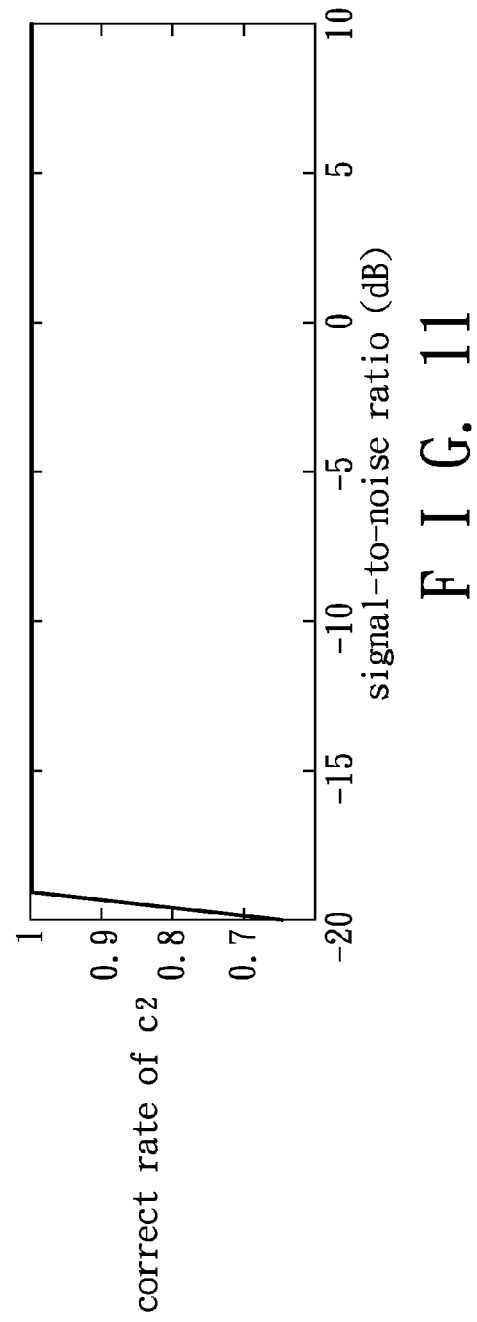

FIGS. 10 and 11 illustrate the correct rates of ($d_2$) and ($c_2$) when the input sequence (A) and the reference sequence (B) are partitioned twice. The results indicate that neglecting extreme noisy environments, the second group parameter ($d_2$) and the second shift number ($c_2$) thus computed should be correct, and the STD of the code phase shift (q), as shown in FIG. 12, is 0. The performance is significantly improved with the second partition.

Figure 13:
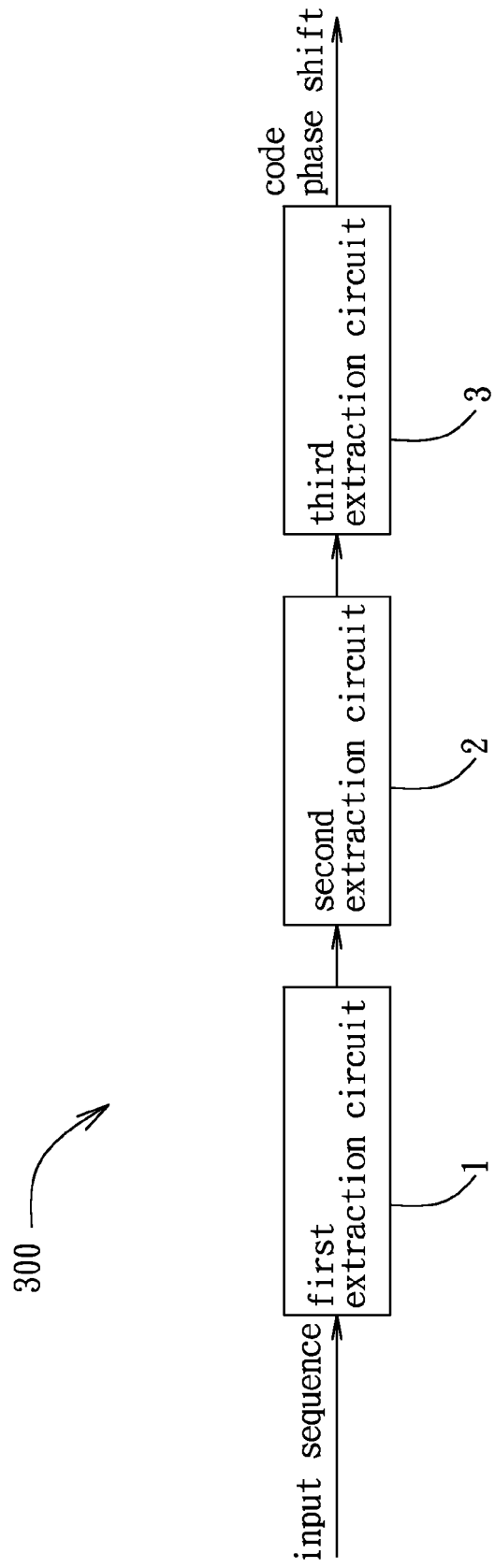
FIG. 13 is a schematic block diagram of an example of an acquisition device.

It is noted that, in other embodiments where even better performance is required, a third partition may be implemented by an acquisition device 300 shown in FIG. 13. The acquisition device 300 includes at least a third extraction circuit 3 having a similar configuration as that of the second extraction circuit 2. The corresponding operation is similar to the previously described method, and will be omitted herein for the sake of brevity.

To sum up, the present invention can process the input sequence (A) with a number (N) of bits by only having to execute a number (3N) of addition operations (based on Equations (7) to (9)) for the first partition and another 3N addition operations (based on Equations (11) to (13)) for the second partition. Generally, two partitions will be sufficient for achieving a relatively good result, meaning at most a number (6N) of addition operations are required. It is worth noting that no multiplication is required in this invention to process the input sequence (A), such that the computational load can be greatly reduced compared to the conventional FFT method. Moreover, it is readily appreciated by those skilled in art that all the coefficients involved in the additions are either 0 or 1, and is easier to implement using electronic circuits compared to the coefficients involved in the FFT method.

While the present invention has been described in connection with what are considered the most practical and preferred embodiments, it is, understood that this invention is not limited to the disclosed embodiments but is intended to cover various arrangements included within the spirit and scope of the broadest interpretation so as to encompass all such modifications and equivalent arrangements.

What is claimed is:

1. A method for acquiring a code phase shift between an input sequence and a reference sequence, said method to be implemented using an acquisition device that includes a mapping unit, a comparison unit and a calculating unit, and comprising the following steps of:

(A) configuring the mapping unit to transform the input sequence into an input signal with a complex phase, and to transform the reference sequence into a reference signal with a complex phase;

(B) configuring the comparison unit to compute a phase coherent indicator according to a phase relationship between the input signal and the reference signal; and (C) configuring the calculating unit to obtain the code phase shift between the input sequence and the reference sequence based on a phase of the phase coherent indicator and a number of bits of the input sequence;

wherein:

in step (B), the comparison unit is further configured to obtain the phase coherent indicator based on the bits of the input sequence; and in step (C), when the phase of the phase coherent indicator is between $$\left(\frac{2\pi}{N} \cdot q - \frac{\pi}{N}\right) \text{ and } \left(\frac{2\pi}{N} \cdot q + \frac{\pi}{N}\right),$$

the calculating unit is further configured to compute the code phase shift between the input sequence and the reference sequence as q, where N is the number of the bits of the input sequence, and $0 \leq q < N$.

2. The method as claimed in claim 1, the input signal including the number N of bits $\{x_0, x_1, x_2 \ldots, x_{N-1}\}$, the reference signal including the number N of bits $\{y_0, y_1, y_2 \ldots, y_{N-1}\}$ wherein:

in step (A), the input sequence is partitioned and transformed into a number $K_1$ of first input signal groups with complex phases, each including a number $M_1$ of bits ($x_{n_1K_1+i}$) after the mapping unit, and the reference sequence is partitioned and transformed into the number $K_1$ of first reference signal groups with complex phases, each having the number $M_1$ of bits ($y_{n_1K_1+i}$) after the mapping unit, where $n_1$ is a variable with values iterating from 0 to ($M_1-1$), $N=K_1 \times M_1$ and i is a variable with values iterating from 0 to ($K_1-1$);

in step (B), the comparison unit is further configured to obtain a plurality of first indicators, each of which is computed based on a respective permutation of the first input signal groups with a particular order and a corresponding permutation of the first reference signal groups with an offset of a specified number of bits from the first input signal groups; and in step (C), the calculating unit is further configured to identify one of the first indicators with a largest magnitude serving as the first phase coherent indicator used in step (C), and is configured to obtain, when said first phase coherent indicator with the largest magnitude has a phase between $$\left(\frac{2\pi}{M_1} \cdot c_1 - \frac{\pi}{M_1}\right) \text{ and } \left(\frac{2\pi}{M_1} \cdot c_1 + \frac{\pi}{M_1}\right),$$

and is based on the respective permutation of the first input signal groups and the corresponding permutation of the first reference signal groups with an offset of a number of $d_1$ bits, the code phase shift based on the numbers $d_1$ and $c_1$, where $0 \leq d_1 < (K_1-1)$, and $c_1$ is a first shift number ranging from 0 to $M_1$, said first input signal groups conforming with said first reference signal groups as being offset by the first shift number $c_1$ of bits.

3. The method as claimed in claim 2, wherein, in step (C), the calculating unit is further configured to compute the code phase shift based upon $q=(c_1 K_1+d_1)$.

4. The method as claimed in claim 2, further comprising the following steps of:

configuring the mapping unit to obtain a number $K_2$ of second input signal groups with complex phases from a first input sequence, each of which is partitioned and transformed from respective $M_2$ bits of the input sequence $X(n_2 K_1 K_2+jK_1+(z_1+d_1)) \mod N$, and to obtain the number $K_2$ of second reference signal groups with complex phases from a first reference sequence, each of which is partitioned and transformed from the respective $M_2$ bits of the reference sequence $y_{n_2 K_1 K_2+jK_1+z_1}$, where $n_2$ is a variable with values iterating from 0 to $(M_2-1)$, $M_1=K_2 \times M_2$, $0 \le j \le (K_2-1)$, and $z_1$ indicates a part of the first input signal groups associated with said one of the first indicators with the largest magnitude;

configuring the comparison unit to obtain a plurality of second indicators, each of which is computed based on respective permutation of the second input signal groups with a particular order and a corresponding permutation of the second reference signal groups with an offset of a specified number of bits from the second input signal groups; and configuring the calculating unit to identify one of the second indicators with a largest magnitude, and to compute, when said second phase coherent indicator with the largest magnitude has a phase between $$\left(\frac{2\pi}{M_2} \cdot c_2 - \frac{\pi}{M_2}\right) \text{ and } \left(\frac{2\pi}{M_2} \cdot c_2 + \frac{\pi}{M_2}\right)$$

and is associated with the second input signal groups and the second reference signal groups with an offset of a number $d_2$ of bits therebetween, the code phase shift based upon $(c_2 K_2+d_2) K_1+d_1$, where mod represents modulus arithmetic, $0 \le d_2 < K_2$, and $c_2$ is a second shift number ranging from 0 to $M_2$, said second input signal groups conforming with said second reference signal groups as being offset a by second shift number $c_2$ of bits.

5. A method for acquiring a code phase shift between an input sequence and a reference sequence, said method to be implemented using an acquisition device that includes a first mapping unit, a first comparison unit and a first calculating unit, and comprising the following steps of:

(a) configuring the first mapping unit to partition the input sequence including a number N of bits $\{x_0, x_1, x_2 \ldots, x_{N-1}\}$ into a number $K_1$ of first input sequence groups each including a number $M_1$ of bits $(x_{n_1 K_1+i})$, where $n_1$ is a variable with values iterating from 0 to $(M_1-1)$, $N=K_1 \times M_i$, and i is a variable with values iterating from 0 to $(K_1-1)$, and to transform the first input sequence groups into first input signal groups with complex phases, and to partition the reference sequence including the number N of bits $\{y_0, y_1, y_2 \ldots, y_{N-1}\}$ into the number $K_1$ of first reference sequence groups each including the number $M_1$ of bits $(y_{n_1 K_1+i})$ and to transform the first reference sequence groups into first reference signal groups with complex phases;

(b) configuring the first comparison unit to obtain a plurality of first indicators, each of which is computed based on a respective permutation of the first input signal groups with a particular order and a corresponding permutation of the first reference signal groups with an offset of a number of $m_1$ bits from the first input signal groups, where $m_1$ ranges from 0 to $(K_1-1)$; and (c) configuring the first calculating unit to obtain the code phase shift based on one of the numbers $m_1$ that is associated with one of the first indicators with a largest magnitude.

6. The method as claimed in claim 5, wherein, in step (c), the first calculating unit is further configured to obtain the code phase shift further based on a first shift number $c_1$, where said first input signal groups conforms with the first reference signal groups as being offset by the first shift number $c_1$ of bits.

7. The method as claimed in claim 6, wherein, in step (c), the first calculating unit is further configured to compute the first shift number $c_1$ based upon $$c_1 = \frac{\Omega_1}{2\pi} \cdot M_1,$$

where $\Omega_1$ is a phase of said first phase coherent indicator with the largest magnitude, and is configured to transfer the first shift number $c_1$ to an integer using one of a floor function, a ceiling function and a round half up function.

8. The method as claimed in claim 5, the acquisition device further including a second mapping unit, a second comparison unit and a second calculating unit, the method further comprising the following steps of:

(d) for each of the first input sequence groups, configuring the second mapping unit to partition a $(i+d_1)$th one of the first input sequence groups into a number $K_2$ of second input sequence groups each including a number $M_2$ of bits $x_{(n_2 K_1 K_2+jK_1+(i+d_1)) \mod N}$ and to transform the second input sequence groups into second input signal groups with complex phases, and to partition the first reference sequence groups into a number $K_2$ of second reference sequence groups each including a number $M_2$ of bits $y_{n_2 K_1 K_2+jK_1+i}$ and to transform the second reference sequence groups into second reference signal groups with complex phases, where $M_1=K_2 \times M_2$, $n_2$ is a variable with values iterating from 0 to $(M_2-1)$, j is a variable with values iterating from 0 to $k_2$, mod represents modulus arithmetic, and $d_1$ is one of the numbers $m_1$ that results in the first phase coherent indicator with a largest magnitude;

(e) configuring the second comparison unit to obtain a plurality of second indicators, each of which is computed based on a respective permutation of the second input signal groups with a particular order and a corresponding permutation of the second reference signal groups with an offset of a number of $m_2$ bits from the second input signal groups, and for each of the numbers $m_2$, to obtain a characteristic signal based on a part of said second indicators that are associated with a particular one of the numbers $m_2$, where $m_2$ ranges from 0 to $(K_2-1)$; and (f) configuring the second calculating unit to identify one of the characteristic signals with a largest magnitude, and to compute the code phase shift based on one of the numbers $m_2$ that is associated with said one of the characteristic signals with the largest magnitude.

9. The method as claimed in claim 8, further comprising a step of:
configuring the second calculating unit to obtain the code phase shift based on said one of the numbers $m_1$ that is associated with said one of the first indicators with the largest magnitude, one of the numbers $m_2$ that is associated with said one of the second indicators with a largest magnitude, and a second shift number $c_2$, where said second input signal groups conforming with said second reference signal groups as being offset by a second shift number $c_2$ of bits.

10. The method as claimed in claim 8, the acquisition device further including a coherence correction unit, said method further comprising, before step (f), the following steps of:
   (g) when the magnitude of said one of the characteristic signals with the largest magnitude is not larger than a threshold value, configuring the coherence correction unit to obtain another one of the numbers $m_1$ that is associated with one of the first indicators having a second largest magnitude; and
   (h) configuring the acquisition device to repeat steps (d), (e) and (g) until said characteristic signal that is associated with said another one of first indicators with the numbers $m_1$ is larger than the threshold value; and
   (i) configuring the second calculating unit to execute step (f).

11. A device for acquiring a code phase shift between an input sequence and a reference sequence, said device comprising:
   a first mapping unit configured to partition the input sequence including a number N of bits $\{x_0, x_1, x_2 \ldots, x_{N-1}\}$ into a number $K_1$ of first input sequence groups each including a number $M_1$ of bits $(x_{n_1K_1+i})$ and to transform the first input sequence groups into first input signal groups with complex phases, and to partition the reference sequence including the number N of bits $\{y_0, y_1, y_2 \ldots, y_{N-1}\}$ into the number $K_1$ of first reference sequence groups each including the number $M_1$ of bits $(y_{n_1K_1+i})$ and to transform the first reference sequence groups into the number $K_1$ of first reference signal groups with complex phases, where $n_1$ is a variable with values iterating from 0 to $(M_1-1)$, $N=K_1 \times M_1$, and i is a variable with values iterating from 0 to $(K_1-1)$;
   a first comparison unit configured to obtain a plurality of first indicators, each of which is computed based on a respective permutation of the first input signal groups with a particular order and a corresponding permutation of the first reference signal groups with an offset of a number of $m_1$ bits from the first input signal groups, where $m_1$ ranges from 0 to $(K_1-1)$; and
   a first calculating unit configured to obtain the code phase shift based on one of the numbers $m_1$ that is associated with one of the first indicators with a largest magnitude.

12. The device as claimed in claim 11, wherein said first calculating unit is further configured to obtain the code phase shift further based on a first shift number $c_1$, said first input signal groups conforming with said first reference signal groups as being offset by the first shift number $c_1$ of bits.

13. The device as claimed in claim 11, further comprising:
   a second mapping unit configured, for each of the first input sequence groups, to partition a $(i+d_1)$th one of the first input sequence groups into a number $K_2$ of second input sequence groups each including a number $M_2$ of bits $x_{(n_2K_1K_2+jK_1+(i+d_1)) \bmod N}$ and to transform the second input sequence groups into the number $K_2$ of second input signal groups with complex phases, and to partition an ith one of the first reference sequence groups into the number $K_2$ of second reference signal groups each including the number $M_2$ of bits $y_{n_2K_1K_2+jK_1+i}$ and to transform the second reference sequence groups into the number $K_2$ of second reference signal groups with complex phases, where $M_1 = K_2 \times M_2$, $n_2$ is a variable with values iterating from 0 to $(M_2-1)$, j is a variable with values iterating from 0 to $k_2$, mod represents modulus arithmetic, and $d_1$ is one of the numbers $m_1$ that results in one of the first indicators with a largest magnitude;
   a second comparison unit configured to obtain a plurality of second indicators, each of which is computed based on a respective permutation of the second input signal groups with a particular order and a corresponding permutation of the second reference signal groups with an offset of a number $m_2$ of bits from the second input signal groups, and for each of the numbers $m_2$, to obtain a characteristic signal based on a part of said second indicators that are associated with a particular one of the numbers $m_2$, where $m_2$ ranges from 0 to $(K_2-1)$; and
   a second calculating unit configured to identify one of the second indicators with a largest magnitude, and to compute the code phase shift based on one of the numbers $m_2$ that is associated with said one of the characteristic signals with the largest magnitude.

14. The device as claimed in claim 13, further comprising a coherence correction unit configured, when the magnitude of said characteristic signal with the largest magnitude is not larger than a threshold value, to obtain another one of the numbers $m_1$ that is associated with one characteristic signal having a second largest magnitude, wherein:
   said second mapping unit is further configured to obtain another set of second input and reference signal groups based on said another one of the numbers $m_1$, and said second comparison unit is further configured to obtain another set of characteristic signals accordingly; and
   when said coherence correction unit determines that one of said another set of the characteristic signals with a largest magnitude, as being larger than the threshold value, said second calculating unit is further configured to compute the code phase shift based on one of the numbers $m_2$ that is associated with said one of the characteristic signals with the largest magnitude.

\* \* \* \* \*